April 10, 1962   R. O. KEELING, JR   3,029,341
X-RAY ABSORPTION SPECTROMETER

Filed Nov. 4, 1959   2 Sheets-Sheet 1

INVENTOR.
ROLLAND O. KEELING JR.
BY
ATTORNEY

3,029,341
X-RAY ABSORPTION SPECTROMETER
Rolland O. Keeling, Jr., Oakmont, Pa., assignor to Gulf Research & Development Company, Pittsburgh, Pa., a corporation of Delaware
Filed Nov. 4, 1959, Ser. No. 850,842
3 Claims. (Cl. 250—51.5)

The present invention relates to new and useful improvements in double-crystal, X-ray spectrography, and more particularly pertains to a method of and apparatus for comparing and making measurements of samples as to the manner in which their absorptivity varies with wave length.

Double-crystal, X-ray spectrography involves an arrangement wherein collimated X rays are reflected from two crystal faces to an X-ray detector such as a Geiger counter, with the sample undergoing analysis being disposed in the path of the X rays passing between the source and the detector. The angles of reflection of the X rays by the crystal determine rather precisely the wave length of the X rays detected by the X-ray detector. Counting and recording means are customarily associated with the detector to record a value that is dependent upon the rate at which X rays of a certain wave length (determined as indicated previously) pass through a sample disposed in a viewing position, that is in the aforementioned X-ray travel path. Various parameters of the rate at which X rays pass through a sample are known in the art; however, the preferred one of these is the time required for the detector to sense a predetermined number of X-ray counts. Other parameters can, as will be appreciated, be used in connection with the instant invention, but the stated preference is for the reason that the time-interval parameter greatly reduces statistical error. In the customary mode of making an analysis of a sample, individual runs are made with respect to each sample.

Broadly, the present invention involves comparing or making measurements with respect to a plurality of samples while making a single run of varying the X-ray wave length, and optionally also making a measurement of a blank relative to each X-ray wave length with respect to which measurements are made, it being understood that the intensity of collimated X rays provided by the source during all the measurements made for any particular X-ray wave length is maintained constant.

In greater detail, the invention involves the provision of a sample holder that can be rotated in a stepwise fashion to cyclically and sequentially position a plurality of samples (the term "sample" being employed in the sense of applicability to a blank of effectively zero absorptivity), and advancing the sample holder by an amount sufficient to position the next sample in the cyclic sequence in viewing position upon the completion of a parameter measurement of the sample in viewing position having been completed. In the preferred mode of the invention, advance of the sample holder is made upon the passage of a time interval sufficient for a fixed X-ray count to have been made. Furthermore, the invention entails changing the angular position of at least one of the crystals intermediate the completion of a cycle of all the samples having been disposed in the viewing position, with the crystals being maintained in fixed position during each cycle of the samples being placed in viewing position.

The invention will be best appreciated upon reference to the accompanying drawings illustrative of a preferred embodiment of the invention, wherein.

Figure 1:
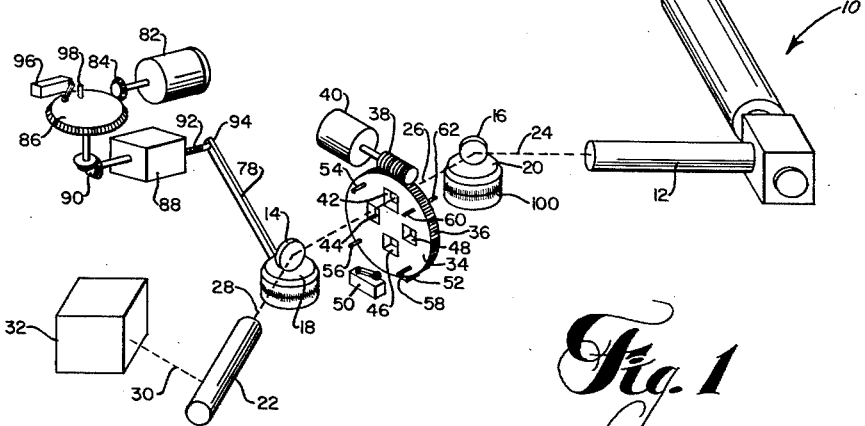
FIGURE 1 is a diagrammatic perspective view of the double-crystal, X-ray spectrographic apparatus.

Referring to FIGURE 1, the numeral 10 designates generally an X-ray source including a collimation tube 12 provided with customary collimating slits, not shown. The numerals 14 and 16 designate reflecting crystals (preferably consisting of pure silicon, calcite, or quartz) mounted upon supports 18 and 20, respectively. An X-ray detector such as a Geiger counter is designated at 22, the arrangement being such that X rays emitted by the source 10 through the collimation tube 12 travel along the path shown in dashed lines 24, 26, and 28 to the detector 22. It will be understood that X rays traveling along the portion of the path indicated at 24 may include X rays of many wave lengths but that the wave lengths of the X rays traveling the path portions 26 and 28, especially the latter, are essentially mono-energetic, that is, possess a sharply defined wave length due to the laws of X-ray reflection from the faces of the crystals 14 and 16.

Double-crystal X-ray spectrometers per se are well known in the art. For an exposition of the general theory of the double crystal spectrometer reference may be made to the book by Compton and Allison entitled X-Rays in Theory and Experiment (D. Van Nostrand Company, Inc.), pages 709 et seq. The crystals 14 and 16 are generally designated in the art as A crystal and B crystal (cf. p. 711 of the above-mentioned book).

The output of the X-ray detector 22 is fed by means schematically illustrated by the dashed line 30 to a counting and recording means diagrammatically shown at 32. Means is provided for cyclically and sequentially positioning samples in viewing position, it being understood that the expression "viewing position" has reference to any of the travel path portions 24, 26, and 28 (the portion 26 being employed in the illustrated embodiment by way of example only). Such means comprises a rotatably mounted sample holder 34 (which can be of brass, steel, etc.) that is of disc-like general configuration, the outer periphery being threaded as at 36 to cooperate with a worm gear 38 driven by an electric motor 40, whereby the sample holder 34 can be rotated about its central axis. The sample holder 34 is provided with a plurality of windows or openings 42, 44, 46, and 48 therethrough that are arranged so that rotation of the holder 34 cyclically and sequentially positions such windows so that the travel path 26 of the X rays passes therethrough. The windows 42, 44, 46, and 48 are large enough to accommodate the beam of collimated X rays. FIGURE 1 shows holder 34 in such angular position that the travel path 26 passes through window 42. With respect to each of the windows 42, 44, 46, and 48, a sample, not shown, can be disposed in the travel path of the X rays. A convenient method is to form a pellet of the material to be analyzed and allow the pellet sample to adhere to the surface of a piece of pressure-sensitive tape applied to the holder 34 so as to extend across the opening. Another useful alternative is to simply coat the tacky surface of a pressure-sensitive tape extending across the window with a powdered specimen of the material to be analyzed. It will be appreciated that the showing of four windows is purely arbitrary and that a greater or lesser number of windows can be used. Perhaps also, it should be mentioned at this time that ordinarily one of the windows will be left as a void so as to constitute a blank of zero absorptivity with one or more of the other windows being filled with samples in the manner aforesaid.

For reasons to be set forth in detail hereinafter, a pair of normally open microswitches 50 and 52 are disposed adjacent the holder 34, with the microswitch 50 being disposed so as to be closed by pins or cams 54, 56, 58, and 60 during rotation of the holder 34. The switch 52 is disposed so as to be closed by a further pin or cam 62 during rotation of the holder 34.

Figure 2:
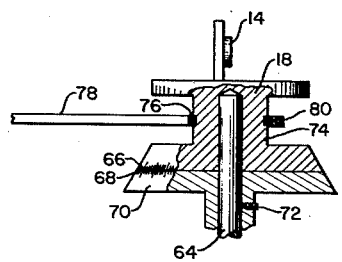
FIGURE 2 is an enlarged detail view of the mounting means for one of the crystals, such view being in elevation and partially shown in central vertical section.
Figure 3:
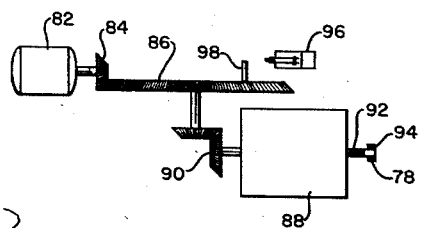
FIGURE 3 is an enlarged detail view of mechanism for actuating changes in the angular position of one of the crystals.

Means is provided for varying the angular disposition of the crysal 14 in a stepwise fashion. The mechanical means for actuating such angular adjustment of the crystal 14 is shown in FIGURES 1, 2, and 3. Referring to FIGURE 2, it will be seen that the support 18 is mounted for rotation about a vertical axis coincident with the face of the crystal 14 on a fixed vertical shaft 64. The lower peripheral portion of the support or head 18 is provided with indicia 66 for cooperating with indicia 68 on a collar 70 adjustably fixed to the shaft 64 by a set screw 72. The arrangement is such that the angular position of the support or head 18 can be manually adjusted to any desired angle with an accuracy say on the order of one minute of arc. The support or head 18 includes a reduced portion 74 that is embraced by clamping loop 76 carried at the end of an actuating arm 78. The loop 76 is clamped to the reduced portion 74 of the support or head 18 in adjusted angular relation thereto by means of a threaded fastening device indicated at 80. The arrangement is such that once the angular position of the support or head 18 is set with respect to the fixed shaft 64 and the arm 78 clamped thereto, the angular position of the support or head 18 can be varied by actuating movement of the arm 78.

Means is provided for actuating the arm 78 that comprises an electric motor 82 connected to a beveled spur gear 84 that drives a beveled gear 86. The beveled gear 86 in turn drives a reduction gear box 88 through gearing 90. The reduction gear box 88 includes a micrometer screw arrangement, the shaft of which is shown at 92. The shaft 92 is connected to the arm 78 at 94, and the arrangement is such that the shaft 92 is axially advanced a very short increment of distance during a single rotation of the gear 86. In an actual unit of the illustrated apparatus, the length of the arm 78 is such in relation to the axial displacement of the shaft 92 occurring upon one revolution of the gear 86 that the angular position of the support or head 18 is changed by an amount on the order of about seven seconds of arc. Of course, such amount of angular change is arbitrary and will vary slightly with the angular relation of the arm 78 to the axis of the shaft 92 in accordance with simple trigonometric considerations readily appreciated by those skilled in the art. Though such angular displacement is arbitrary and can be more or less than the stated value, it will be evident to those familiar generally with spectrographic methods of analysis that such angle should be small and in general substantially less than the degree of accuracy with which the support or head 18 can be originally adjusted manually.

A normally open microswitch 96 is disposed adjacent the gear 86 so as to be closed by a pin or cam 98 carried by the gear 86.

Though in the illustrated embodiment of the invention, the crystal 14 is shown to be the one for which arrangement is made for incremental angular adjustment, it is to be expressly understood that an equivalent alternative resides in fixing the crystal 14 and making arrangement to incrementally adjust the angular position of the crystal 16 rather than crystal 14. These two alternative arrangements are precisely equivalent to each other.

The support 20 is mounted for rotation about a vertical axis coincident with the face of the crystal 16, angular adjustment of the support 20 with respect to a fixed collar or base 100 being facilitated by means of the illustrated indicia. Means, not shown, is provided for securing the support 20 in any manually selected angular position.

Figure 4:
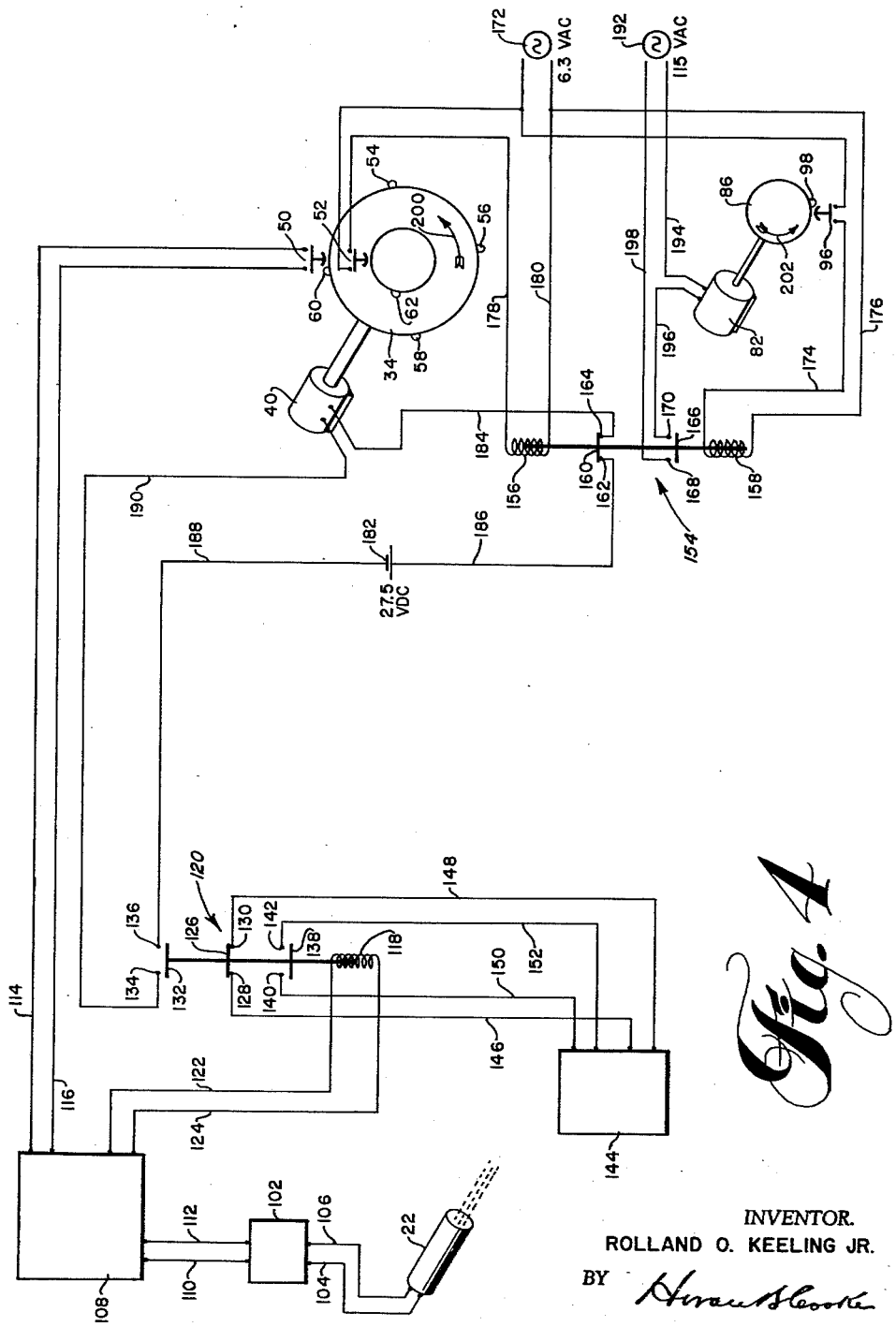
FIGURE 4 is a schematic diagram of the electrical system.

Attention is now directed to FIGURE 4 wherein the electrical system is schematically illustrated. The numeral 102 designates an amplifier connected to the detector 22 by leads 104 and 106 for amplifying the output of the detector 22. The output of the amplifier 102 is fed to a scaler 108 by leads 110 and 112. The scaler can conveniently be a commercially available unit, such as North American Philips Scaler and Rate Meter Type 42145, which includes a circuit, not shown, that controls the counting of pulses fed thereto by the leads 110 and 112, such circuit being effective to initiate a counting cycle upon closure of such circuit. This circuit includes a pair of leads 114 and 116 connected to the normally open microswitch 50 so that the scaler is initiated on a counting cycle upon closure of the switch 50. As will be understood, the conventional scaler 108 includes a pair of terminals that are energized solely during the scaler going through a counting cycle, that is, from initiation of the counting cycle until a predetermined count is accumulated. Such terminals are connected to the solenoid 118 of a relay 120 through a pair of leads 122 and 124. The scaler 108 and its described functions are familiar to those skilled in the art, and further amplification will serve no useful purpose and merely obscure the actual novelty of the apparatus.

The relay 120 is shown with the solenoid 118 energized, wherein a movable contact 126 closes a pair of fixed contacts 128 and 130, a movable contact 132 is open with respect to a pair of contacts 134 and 136, and a movable contact 130 is open with respect to a pair of contacts 140 and 142.

The numeral 144 designates a conventional-type timer and printer well known to those skilled in the art, such as the Streeter-Amet Model TIMA–.1S. The timer and printer 144 includes a circuit, not shown, effective to measure individual time intervals that a pair of leads 146 and 148 connected thereto are electrically connected by the movable contact 126 engaging the contacts 128 and 130. The timer and printer 144 also includes a circuit, not shown, for actuating a print out of each measured time interval terminating upon opening of the contacts 126, 128, and 130, and upon a pair of leads 150 and 152 connected thereto being electrically connected by closure of the contacts 138, 140, and 142. The timer and printer 144, as is conventional, includes a zero reset feature whereby the timing is not cumulative. As in the case of the scaler 108, the state of the art is such that further description of the timer and printer is unnecessary, and in fact undesirable as an obscuration of the real contribution to the art.

The numeral 154 designates a latching relay generally, the same including solenoids 156 and 158. The relay 154 is shown with its elements in the positions occupied when the solenoid 158 is the last to have been energized, such elements comprising a movable contact 160 in contact with a pair of contacts 162 and 164, and a movable contact 166 open with respect to a pair of contacts 168 and 170. The solenoid 158 is connected in series with the microswitch 96 to a 6.3 v. A.C. power supply 172 by leads 174 and 176. The solenoid 156 is connected in series with the microswitch 52 to the power supply 172 by leads 178 and 180.

The electric motor 40 is connected for energization to a 27.5 v. D.C. battery 182 by a series circuit that includes a lead 184, contacts 160, 162, 164, lead 186, battery 182, lead 188, contacts 132, 134, 136, and a lead 190. The electric motor 82 is connected to a 115 v. A.C. power supply 192 by a series circuit that includes leads 194, 196, 198, and contacts 166, 168, and 170.

The operation of the apparatus will now be readily understood. Let it be assumed that the apparatus is in operation and that window 42 is in the position shown thereof in FIGURE 1 which corresponds to the cam 60 being just beyond contact with the microswitch 50 in the counterclockwise direction (see FIGURE 4) which is the direction of drive of the holder 34 as indicated by the arrow 200. It will be further assumed that the relay 154 is in the condition shown, and that the cam 98 is just beyond contact with the microswitch 96 in the counterclockwise direction, the normal direction of drive of the gear 86 being as indicated by the arrow 202. Also, the cam 62 is not in engagement with the microswitch 52. Finally, let it be assumed that a counting cycle has been initiated and that the count accumulated by the scaler 108 is less than the predetermined value.

With the above assumptions, the event next to occur is the accumulation by the scaler 108 of the predetermined value. The relay 120 is in the position shown because of the scaler being operative with the consequence that the motor 40 is de-energized (contacts 132, 134, and 136 being open); the timer and printer 144 is measuring time (contacts 126, 128, and 130 being closed); and print out is awaiting de-energization of the solenoid 118 and closure of the contacts 138, 140, and 142.

Eventually, the requisite count will be accumulated by the scaler 108, whereupon the solenoid 118 is de-energized, with the result that contacts 138, 140, and 142 close to cause print out; contacts 126, 128, and 130 open terminating time measurement and reset to zero on print out; and contacts 132, 134, and 136 close completing the energization circuit for the electric motor 40. Motor 40 will drive the holder 34 until cam 54 momentarily closes the switch 50 whereupon the scaler 108 is again started on a counting cycle, with consequent energization of the relay 120 that in turn de-energizes the motor 40 on the opening of the contacts 132, 134, and 136. Notwithstanding the de-energization of the motor 40 resulting from cam 54 closing the switch 50, the inertia of the motor 40 coupled with the small angular range of cam 54 travel that can close the switch 50 is sufficient to assure the cam 54 having traveled out of switch closing position before the holder 34 comes to rest following de-energization of the motor 40. The apparatus is now in the same condition as initially assumed, except that the cam 54 now occupies the position initially occupied by cam 60. Needless to say, such change is accompanied by the holder 34 having moved to such an extent that window 44 is in the viewing position previously occupied by window 42. The cycle just described is now repeated successively with respect to cams 56, 58, 60, 54, etc. so that the windows 42, 44, 46, and 48 are cyclically and sequentially positioned in viewing position, each of such windows remaining in the viewing position for a period of time sufficient for a fixed X-ray count to accumulate.

Superimposed, in a sense, upon the cyclic operation just described that cyclically and sequentially positions all the windows 42, 44, 46, and 48 in viewing position is a further cyclic operation, the action of each cycle of which takes place intermediate the time intervals during which two windows are successively positioned in viewing position. This superimposed cyclic operation occurs upon the cam 62 momentarily closing the switch 52, whereupon the solenoid 156 is energized with the result of the contacts 166, 168, and 170 being closed, and contacts 160, 162, and 164 being opened. It should be noted that the cam 62 is angularly disposed between cams 58 and 62, or in other words the switch 52 will only be closed while the motor 40 is operating to move cam 60 into switch closing position. With this in mind, it will be seen that opening of the contacts 160, 162, and 164 will merely interrupt the operation of the motor 40 until the contacts 160, 162, and 164 are again closed. Here again, the inertia of the motor 40 suffices to move the cam 62 beyond switch closing position prior to the holder 34 stopping rotation. Closing of the contacts 166, 168, and 170 energizes the motor 82. Motor 82 operation continues until the cam 98 closes the switch 96, whereupon the solenoid 158 is energized to return the relay 154 to its original position. This action is accompanied by motor 40 being again energized and the motor 82 being de-energized. It is to be understood however that the inertia of the motor 82 is sufficient to cause the cam 98 to move beyond switch closing position. Here, as in the previously described coasting action of switch operating cams, it must be plain that such angular coasting is small in magnitude, only being sufficient to allow the respective switches operated thereby to reassume their normally open positions.

The described cyclic operation of the motor 82 in relation to movement of the cams 62 and 98 makes it clear that the motor 82 through the gearing and mechanical linkage connection to the arm 78 operates to rotate the crystal 14 through a minute angle once during each rotation of the holder 34, and that such actuation occurs intermediate the times during which two successive windows are placed in viewing position.

Only the power supplies for the electric motors 40 and 82 and the relay 154 are shown, it being understood that conventional power supplies are provided for the X-ray source 10, the Geiger counter 22, the scaler 108, the amplifier 102, and the timer and printer 144. It will be apparent also that the three last-named elements constitute the apparatus indicated at 32 in FIGURE 1.

From the foregoing, the operation of the apparatus should be quite plain. The apparatus is initially adjusted for one extreme of the band or spread of wave lengths with which the investigator is interested, and automatic operation is then commenced to make a run through such range of wave lengths. One of the windows can, if deemed desirable or expedient, be used in conjunction with a substance of known absorptivity characteristics for purposes of calibration or as a standard of comparison with a sample of unknown properties concurrently being analyzed.

The result obtained in the use of the described apparatus is in the form of a sequence of printed numbers made up of groups of four numbers each constituting each cycle of all the windows being disposed in viewing position and the crystals remaining fixed. Such data can be conveniently plotted as desired.

A very important advantage of the practice of the invention resides in an individual measurement being made with respect to all of a plurality of samples for each of a number of crystal positions. In other words, for each of a plurality of slightly differing X-ray wave lengths, all samples are identically compared. Data obtained in this manner is of materially increased interpretive value as compared to the making of a plurality of runs of varying X-ray wave length. In the latter case, there can be no positive assurance of comparative measurements being obtained for exactly the same X-ray wave lengths. In fact, such would be virtually impossible and very difficult to even approximate. An ancillary advantage resides in only one blank measurement being necessary for all the samples for each wave length. This ancillary advantage is accompanied by a simplification of data processing too.

The subject invention is susceptible to numerous variations without departing from the spirit thereof. Those skilled in the art will instantly recognize, for example, that the apparatus can be adjusted to measure and print the count accumulated in a fixed time for each sample, rather than the preferred and described converse. It has been previously mentioned that the described automatic crystal adjustment can with perfect equality be performed with respect to either of the two crystals. It also has been pointed out that the sample holder 34 can, notwithstanding which of the crystals is automatically shifted, be disposed intermediate the crystals (as shown) in the path portion 26, or be disposed in the path portions 24 or 28. The latter position can for some purposes be in fact preferred to the illustrated position. Other forms of intermittent drives are well known in the art, and suitable selection can be made of those for driving the holder 34 and the crystal 14, provided that the described synchronization of cycles and control is maintained.

The principles of the invention have been described in rather elaborate detail solely to convey a full and complete understanding thereof, and such detailed description should not be taken to impute any narrowness in scope of the invention; attention being directed to the appended claims in order to ascertain the actual scope of the invention.

I claim:

1. In a double-crystal X-ray absorption spectrometer having a source of X-rays, A and B crystals, and a counter-type X-ray detector, the improvement that comprises an automatic sample holder adapted to support a plurality of samples whose absorption is to be measured and adapted to sequentially introduce said samples into the X-ray beam, means connected to the X-ray detector recording the time required for said detector to accumulate a predetermined X-ray count, control means connected to said X-ray detector and to said sample holder initiating the introduction of a new sample into the X-ray beam when said X-ray detector reaches a predetermined count, and automatic means stepwise rotating the B-crystal upon completion of a measurement on all of the samples in said sample holder.

2. In a double-crystal X-ray absorption spectrometer having a source of X-rays, A and B crystals, and a counter-type X-ray detector, the improvement that comprises a sample holder adapted to support a plurality of samples whose absorption is to be measured, said sample holder being adapted to successively sequentially introduce said samples into the X-ray beam, automatic actuating means connected to said sample holder, means connected to said X-ray detector recording the time required for said detector to accumulate a predetermined X-ray count, control means connected to said X-ray detector and to said actuating means initiating actuation of said sample holder when said X-ray detector reaches a predetermined count, and automatic means stepwise rotating the B crystal of the spectrometer upon completion of measurements on all of the samples in said sample holder.

3. In a double-crystal X-ray absorption spectrometer having a source of X-rays, A and B crystals, and a counter-type X-ray detector, the improvement that comprises a sample holder adapted to support a plurality of samples whose absorption is to be measured, said sample holder being adapted to successively sequentially introduce said samples into the X-ray beam, a first automatic actuating means connected to said sample holder, means connected to said X-ray detector recording the time required for said detector to accumulate a predetermined X-ray count, control means connected to said X-ray detector and to said first actuating means initiating actuation of said sample holder when said X-ray detector reaches a predetermined count, a second actuating means connected to said control means and to the B crystal of the spectrometer and adapted to stepwise rotate said B crystal, said control means initiating operation of said second actuating means to stepwise rotate said B crystal upon completion of measurements on all of said samples in said sample holder.

References Cited in the file of this patent

UNITED STATES PATENTS

| | | |
|---|---|---|
| 2,585,916 | Coleman | Feb. 19, 1952 |
| 2,713,125 | Geisler | July 12, 1955 |
| 2,805,341 | Lang | Sept. 3, 1957 |
| 2,819,405 | Bond | Jan. 7, 1958 |

OTHER REFERENCES

Lambert: "Some Practical Aspects of X-Ray Spectrography," unclassified A.E.C. Research and Development Report HW–58967; date of report January 22, 1959, 66 pages.